United States Patent
Golub et al.

(10) Patent No.: US 10,187,483 B2
(45) Date of Patent: Jan. 22, 2019

(54) MANAGING ACCESS TO USER INFORMATION BY APPLICATIONS OPERATING IN AN ONLINE SYSTEM ENVIRONMENT

(71) Applicant: Facebook, Inc., Menlo Park, CA (US)

(72) Inventors: Benjamin Golub, San Francisco, CA (US); Tirunelveli R. Vishwanath, Sunnyvale, CA (US); Arthur George Rudolph, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 766 days.

(21) Appl. No.: 14/458,210

(22) Filed: Aug. 12, 2014

(65) Prior Publication Data
US 2016/0050287 A1   Feb. 18, 2016

(51) Int. Cl.
*H04L 29/08* (2006.01)
(52) U.S. Cl.
CPC ............ *H04L 67/22* (2013.01); *H04L 67/20* (2013.01); *H04L 67/306* (2013.01)
(58) Field of Classification Search
CPC ........ H04L 67/22; H04L 67/306; H04L 67/20
USPC ........................................................ 709/217
See application file for complete search history.

(56) References Cited

U.S. PATENT DOCUMENTS

| | | | | |
|---|---|---|---|---|
| 6,947,404 B1 * | 9/2005 | Zalka | .................. | H04L 63/0815 370/338 |
| 7,949,611 B1 * | 5/2011 | Nielsen | ............... | G06F 21/6245 705/319 |
| 8,136,145 B2 * | 3/2012 | Fetterman | ............... | H04L 63/08 709/204 |
| 8,590,013 B2 * | 11/2013 | Crawford | ................ | G06F 21/34 380/247 |
| 8,769,393 B1 * | 7/2014 | Abhyanker | ............ | G06Q 10/10 715/201 |
| 9,104,885 B1 * | 8/2015 | Strand | ...................... | G06F 21/62 |
| 9,564,025 B1 * | 2/2017 | Nielsen | .................. | G08B 5/002 |
| 9,609,495 B2 * | 3/2017 | Kotecha | .................. | H04W 4/21 |
| 2003/0012382 A1 * | 1/2003 | Ferchichi | .............. | H04L 63/062 380/270 |
| 2003/0061512 A1 * | 3/2003 | Flurry | ................. | H04L 63/0815 726/4 |

(Continued)

*Primary Examiner* — Philip J Chea
*Assistant Examiner* — Wing Ma
(74) *Attorney, Agent, or Firm* — Fenwick & West LLP (57) ABSTRACT

An online system regulates access to information about a user by associating an online system user identifier with a unique application-specific user identifier used by an application to identify the user. Each application communicating with the online system and installed by the user is associated with a unique application-specific user identifier that is associated with the user's online system user identifier. For example, information identifying an installed application and an application-specific user identifier are associated with the user's online system user identifier when the user installs the application. When communicating about a user with an installed application associated with the user, the online system identifies the user via the application-specific identifier associated with the installed application and may provide limited information associated with the online system user identifier associated with the application-specific identifier.

14 Claims, 3 Drawing Sheets

(56) References Cited

U.S. PATENT DOCUMENTS

| | | | | |
|---|---|---|---|---|
| 2005/0015490 A1* | 1/2005 | Saare | ................ | H04L 63/0815 709/225 |
| 2006/0136419 A1* | 6/2006 | Brydon | ................ | G06Q 10/107 |
| 2008/0046976 A1* | 2/2008 | Zuckerberg | ........... | H04L 63/102 726/4 |
| 2008/0077809 A1* | 3/2008 | Hayler | ................ | G06F 12/1466 713/193 |
| 2009/0013413 A1* | 1/2009 | Vera | ................ | G06Q 10/10 726/30 |
| 2009/0049525 A1* | 2/2009 | D'Angelo | ........... | G06F 21/6245 726/4 |
| 2009/0070334 A1* | 3/2009 | Callahan | ................ | G06F 21/604 |
| 2009/0070412 A1* | 3/2009 | D'Angelo | ............... | G06Q 10/10 709/203 |
| 2010/0027527 A1* | 2/2010 | Higgins | ................ | H04W 4/18 370/351 |
| 2010/0049852 A1* | 2/2010 | Whitnah | ................ | G06Q 10/10 709/226 |
| 2010/0175115 A1* | 7/2010 | Choi | ................ | G06F 21/33 726/6 |
| 2010/0274922 A1* | 10/2010 | Reavely | ................ | H04L 67/14 709/238 |
| 2011/0023129 A1* | 1/2011 | Vernal | ................ | G06F 21/6245 726/28 |
| 2011/0093709 A1* | 4/2011 | Lunt | ................ | G06F 17/30864 713/168 |
| 2012/0066037 A1* | 3/2012 | Glen | ................ | G06F 21/6263 705/14.4 |
| 2012/0079019 A1* | 3/2012 | Miettinen | ............... | G06Q 50/00 709/204 |
| 2012/0198268 A1* | 8/2012 | Qureshi | ............. | G06F 11/1443 714/4.1 |
| 2012/0226749 A1* | 9/2012 | Dale | ................ | G06Q 50/01 709/204 |
| 2012/0284786 A1* | 11/2012 | Somani | ............... | H04L 63/0815 726/7 |
| 2013/0036304 A1* | 2/2013 | Lin | ................ | G06F 21/33 713/168 |
| 2013/0139241 A1* | 5/2013 | Leeder | ................ | H04W 12/06 726/9 |
| 2013/0191494 A1* | 7/2013 | Sidhu | ................ | H04L 67/34 709/217 |
| 2013/0254850 A1* | 9/2013 | Alison | ................ | H04W 4/21 726/4 |
| 2013/0282806 A1* | 10/2013 | Steinberg | ............... | G06Q 50/01 709/204 |
| 2013/0305338 A1* | 11/2013 | Casals Andreu | ... | H04L 63/0815 726/8 |
| 2014/0020072 A1* | 1/2014 | Thomas | ................ | H04L 63/0815 726/7 |
| 2014/0032656 A1* | 1/2014 | Hyman | ................ | G06Q 30/02 709/204 |
| 2014/0122580 A1* | 5/2014 | Nuaimi | ................ | H04L 63/0815 709/203 |
| 2014/0122628 A1* | 5/2014 | Yao | ................ | G06Q 10/101 709/206 |
| 2014/0123157 A1* | 5/2014 | Keskitalo | ............. | G06Q 10/107 719/328 |
| 2014/0143322 A1* | 5/2014 | Kotecha | ................ | H04W 4/21 709/204 |
| 2014/0164481 A1* | 6/2014 | Chia | ................ | H04L 67/22 709/203 |
| 2015/0135295 A1* | 5/2015 | Sample | ................ | H04L 67/22 726/7 |
| 2015/0215128 A1* | 7/2015 | Pal | ................ | H04L 9/3228 713/155 |
| 2016/0173615 A1* | 6/2016 | Pattan | ................ | H04L 67/306 709/225 |
| 2016/0308868 A1* | 10/2016 | Dulkin | ................ | H04L 63/0281 |
| 2017/0004588 A1* | 1/2017 | Isaacson | ................ | G06Q 20/12 |

\* cited by examiner

MANAGING ACCESS TO USER INFORMATION BY APPLICATIONS OPERATING IN AN ONLINE SYSTEM ENVIRONMENT

BACKGROUND

This disclosure relates generally to maintaining user information for online system users, and more specifically to managing access to information associated with online system users by applications operating within the online system environment.

An online system, such as a social networking system, allows its users to connect to and communicate with other online users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for increasing engagement with various subjects by presenting content items about the subjects to online system users.

Additionally, an online system frequently allows its users to install and use applications provided by third-party systems. These applications execute within the environment of the online system, allowing users to augment interaction with the online system with additional functionality provided by one or more of the applications. Example applications provided by third-party systems include games, messaging applications, and scheduling applications. An online system user may share application-specific information maintained by applications the user elects to use with other online system users via the online system. While this sharing of application-specific information increases user interaction with the online system, it also increases the difficulty of the online system maintaining the privacy of various user-specific information maintained by the online system.

SUMMARY

An online system associates an online system user identifier with each online system user to uniquely identify each online system user. When a user of the online system installs an application from a third-party system on a client device for use with the online system, the online system receives information from the client device indicating the application installed by the user. Examples of received information include: an identifier associated with the client device, a type of the client device, a date and a time when the application was installed, an application name, and an application identifier.

Based on the received information, the online system generates an application-specific user identifier associated with the user and with the installed application. The online system associates the application-specific user identifier with information identifying the installed application. Example information identifying the installed application includes an application identifier, an application name, and a name or an identifier associated with an entity associated with the application. To regulate access to information associated with users and maintained by the online system by an entity associated with the installed application, the online system associates the online system user identifier associated with the user with the application-specific user identifier and application identifier. The application-specific user identifier identifies the user to the installed application, allowing the installed application to uniquely identify the user without knowledge of the user's online system user identifier. Hence, the installed application identifies the user via the application-specific user identifier, and the online system maintains information associating the application-specific user identifier with an online system user identifier.

When communicating with an entity associated with the installed application, the online system identifies an online system user identifier associated with the application-specific user identifier based on the association between application-specific user identifier and online system user identifier. Information associated with the online system user identifier associated with the application-specific user identifier may be retrieved and communicated to the entity subject to user-specified privacy settings. Additionally, the online system may maintain information associating an entity with multiple applications and provide an application programming interface (API) or other functionality allowing the entity an entity to obtain all application-specific user identifiers maintained for each of the applications associated with the entity. This allows the entity to retrieve information from the online system associated with a user and may target content for presentation to the user via one or more of the applications associated with the entity based on the retrieved information.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
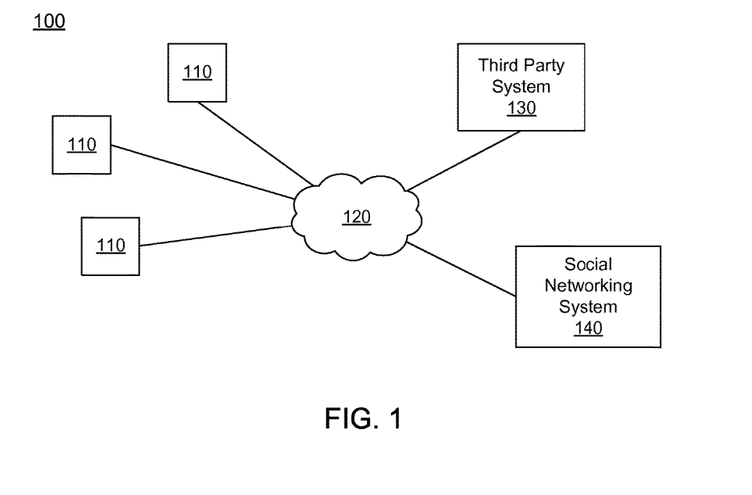
FIG. 1 is a block diagram of a system environment in which an online system operates, in accordance with an embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party website 130 may also communicate information to the online system 140, such as advertisements, content, or information about an application provided by the third-party website 130.

Figure 2:
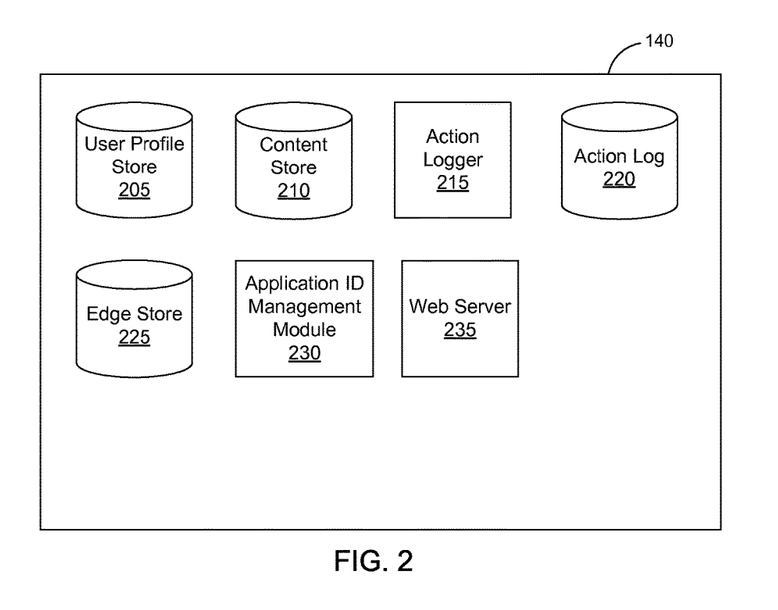
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an application management module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying online system users displayed in an image. A user profile in the user profile store 205 may also maintain references to actions by the corresponding user performed on content items in the content store 210 and stored in the action log 220. Additionally, a user profile associated with a user also includes an online system user identifier that uniquely identifies the user profile to the online system 140. Each user profile includes an online system user identifier, allowing the online system 140 to uniquely identify each online system user.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third-party systems 130 that communicate information to the online system 140. Users may interact with various objects on the online system 140, and information describing these interactions is stored in the action log 220. Examples of interactions with objects include: commenting on posts, sharing links, and checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website, and communicated to the online system 140. For example, an e-commerce website may recognize a user of an online system 140 through a plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or amount of information retrieved by one user about an object, or a number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object, a topic, or another user in the online system 140 based on the actions performed by the user. A user's affinity may be computed by the online system 140 over time to approximate a user's interest in an object, a topic, or another user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The application information management module 230 maintains information associating one or more application-specific user identifiers with an online system user identifier. When an online system user installs an application that communicates with the online system 140 on a client device 110 or performs another suitable interaction with the application, information is communicated from the client device 110 to the application information management module 230 describing the application. Example information received from the client device 110 includes an indication the application was installed, an application name, or an application identifier. In other embodiments, the application information management module 230 receives information from the client device 110 when the user performs an interaction with an application installed on the client device 110. Example interactions with the application include the user interacting with the application via the online system 140 (e.g., signing into the application using login credentials used to access the online system 140). Additionally, the application information management module 230 may also receive information describing the client device 110 on which the application was installed. Example information describing the client device 110 includes an identifier associated with the client device 110 on which the application was installed, a type of the client device 110, and a date and time when the application was installed on the client device 110.

When the application information management module 230 receives information indicating a user of the online system 140 has installed an application communicating with the online system 140, the application information management module 230 generates an application-specific user identifier associated with the application and with the user. The application-specific user identifier is communicated to the application and is used by the application to identify the user. Additionally, the application information management module 230 stores an association between the user's online system user identifier and the application-specific user identifier. Associating the application-specific user identifier with an online system user identifier allows the application to uniquely identify the user and allows the online system 140 to associate information from the application with the user without allowing the application to access the online system user identifier.

Various types of information may be maintained by the application information management module 230 to associate an application-specific user identifier with an online system user identifier. For example, the application information management module 230 associates an application identifier of an application with an application-specific user identifier corresponding to the application. The application identifier may be an application name or any other suitable information identifying the application. In one embodiment, the application information management module 230 associates an online system user identifier with a table that includes associations between application identifiers and application-specific user identifiers. Table 1 shows an example table associated with an online system user identifier of "1234." In the example of Table 1, an application identifier is associated with an application-specific user identifier corresponding to an application associated with the application identifier. Hence, in Table 1, the online system user identifier "1234" is associated with an application-specified identifier of "5678," which is used by an application corresponding to the application identifier "ABC" to identify the user associated with online system user identifier "1234." Similarly, an application corresponding to application identifier "DEF" uses application-specific user identifier "0110" to identify the user associated with online system user identifier "1234," and an application corresponding to application identifier "XYZ" identifies the user associated with online system user identifier "1234" using application-specific user identifier "1222."

TABLE 1

| Application Identifier | Application-Specific User Identifier |
| --- | --- |
| ABC | 5678 |
| DEF | 0110 |
| XYZ | 1222 |

In other embodiments, the application information management module 230 may include any suitable information associating application-specific user identifiers with application identifiers and with an online system user identifier.

When communicating information about a social networking system user with an application, the online system 140 uses the application-specific user identifier. In the example of Table 1, the application corresponding to application identifier "ABC" communicates the application-specific user identifier "5678" to the online system 140 to retrieve information associated with a user. The application information management module 230 determines the online system user identifier associated with the received application-specific user identifier and uses the online system user identifier to retrieve information for communication to the application subject to privacy settings associated with the online system user identifier. The application information management module 230 may provide an application programming interface (API) or other functionality for an application or an entity associated with an application to retrieve information associated with a user and maintained by the online system 140.

Additionally, the application information management module 230 may include information associating an entity with one or more applications. For example, multiple applications identify to the online system 140 an entity providing or developing the applications, and the application information management module 230 stores information associating application identifiers with the entity. Subsequently, the entity may request from the application information management module 230 application-specific user identifiers associated with one or more applications associated with the entity by the online system 140. For example, an entity may request application-specific user identifiers associated with each application associated with the entity. This allows the entity to target content for presentation to the user via multiple applications associated with the entity. Communicating information about an online system user to an application or an entity based on an application-specific user identifier allows the application or entity to receive information about the user from the online system without allowing the application or entity to access additional information associated with the user by the online system 140. This preserves the user's privacy while also allowing the application or entity to personalize content provided to the user based on information the online system 140 provides to the application or to the entity.

The web server 235 links the online system 140 via the network 120 to the one or more client devices 110, as well as to the one or more third-party systems 130. The web server 235 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
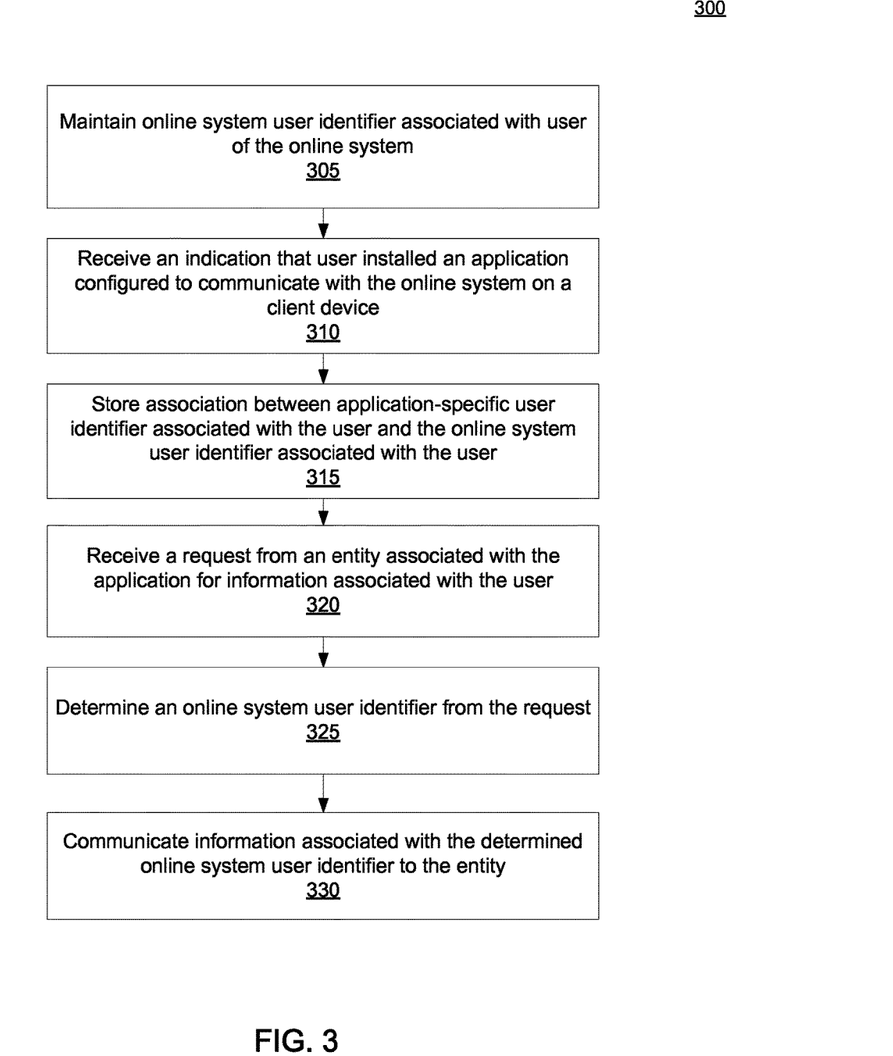
FIG. 3 is a flowchart of a method for regulating access to information associated with a user by an online system by applications communicating with the online system, in accordance with an embodiment.

Managing User Information Access by Applications Operating in a Social Networking System FIG. 3 is a flowchart of one embodiment of a method 300 for regulating access to information associated with a user by an online system 140 by applications communicating with the online system 140. In other embodiments, the method 300 may include different or additional steps than those shown in FIG. 3. Additionally, in other embodiments, the steps described in conjunction with FIG. 3 may be performed in different orders than the order described in conjunction with FIG. 3.

An online system 140 maintains 305 an online system user identifier associated with a user of the online system 140. Each user of the online system 140 is associated with an online system user identifier, allowing the online system 140 to uniquely identify each user. In one embodiment, the online system 140 assigns an online system user identifier to a user when the user initially establishes an account with the online system 140 and maintains 305 the online system user identifier associated with the user the user's user profile.

The user installs, on a client device 110, one or more applications that communicate with the online system 140. In one embodiment, an application installed by the user communicates with the online system 140, allowing the user to share information describing user interactions with the application with other online system users. For example, if the user installs a music player application, information is communicated from the music player application to the online system identifying songs the user played via the music player application, user preferences for songs or artists, or comments from the user regarding songs or artists associated with songs played via the music player application. Other types of applications may communicate other information to the online system 140 describing user interactions with the application.

When the user installs the application on the client device 110, the online system 140 receives 310 an indication that the user installed the application. For example, the online system 140 receives 310 an application identifier of the installed application, an application name of the installed application, or other information describing the application. Additionally, the indication that the user installed the application may also include information describing the client device 110 on which the application was installed. For example, the indication includes an identifier of the client device 110 (e.g., a device name, a network address, a telephone number) a type of the client device 110 (e.g., a general type, a manufacturer model number), a date and time when the application was installed on the client device 110, or any other suitable information. In various embodiments, the indication the application was installed is received 310 when one or more interactions with the application occur. Example interactions with the application causing communication of the indication the application was installed to the online system 140 include the user accessing the application with credentials used to access the online system 140, registering the application, or authorizing the application to communicate with the online system 140.

However, in other embodiments, the online system 140 receives any suitable information from the application to cause generation of an application-specific user identifier associated with the application. For example, the online system 140 receives an indication that the user performs an interaction with the application, logs into the application, or performs any other suitable action involving the application. Hence, a variety of actions may cause the online system 140 to receive an request from the application to generate an application-specific user identifier.

In one embodiment, the online system 140 generates an application-specific user identifier associated with the application associated with the received indication and associates the application identifier with the online system user identifier associated with the user. The application-specific user identifier is associated with the application and allows the application to uniquely identify the user. An association between the application-specific user identifier is stored 315 by the online system 140. In one embodiment, the stored association also identifies the application associated with the application-specific user identifier, so an association between the online system user identifier, the application-specific user identifier, and the application is stored 315. For example, the online system user identifier is associated with a combination of information identifying the application and the application-specific user identifier associated with the application. Example information identifying the application includes an application name, an application identifier, and a third-party system 130 or other entity associated with the application. If the application is associated with an entity that is associated with additional applications, the online system 140 may store an identifier associated with the entity and associate information identifying the application and the additional applications with the identifier associated with the entity.

After storing 315 the association between the application-specific user identifier, the online system 140 receives 320 a request from an entity associated with the application for information associated with the user. The request includes information identifying the user and identifying the application. For example, the request includes an application name or an application identifier as well as information identifying the user, such as the application-specific user identifier used by the application to identify the user. Hence, the application-specific user identifier allows the application to identify the user to the online system 140.

Based on the information included in the received request, the online system 140 determines 325 the online system user identifier associated with the request. In one embodiment, the request includes the application-specific user identifier and the online system 140 extracts the application-specific user identifier from the request and compares the application-specific user identifier to stored application-specific user identifiers. An online system user identifier associated with the stored application-specific user identifier matching the application-specific user identifier extracted from the request is determined 325 to be the online system user identifier associated with the request. Further, the online system 140 may extract information identifying the application as well as an application-specific user identifier from the request and determine 325 the online system user identifier associated with the request as an online system user identifier associated with a stored application-specific user identifier and information identifying an application that match the information extracted from the request. As different application-specific user identifiers are generated for different applications installed by the user but are associated with the single online system user identifier associated with the user, the online system 140 may receive 320 requests that specify different application-specific user identifiers.

In some embodiments, the online system 140 receives 320 a request from an entity associated with multiple applications that communicate with the online system 140 and identifies application-specific user identifiers associated with a set of the applications associated with the entity. For example, the online system 140 identifies application-specific user identifiers associated with each application associated with the entity. The online system 140 may provide an application programming interface (API) or other functionality allowing the entity to retrieve application-specific user identifiers associated with multiple applications associated with the entity. For example, a third-party system 130 provides multiple types of applications to a user that communicate with the online system 140. Example types of applications include a gaming application, a messaging application, a calendar application, a media player application, a scheduling application, or an image capture application. Using the API, the third-party system 130 may provide a particular application-specific user identifier to retrieve information from the online system 140 or an identifier associated with the third-party system 130. If the third-party system 130 provides an identifier associated with the third-party system 130 to the online system 140, application-specific user identifiers associated with multiple applications associated with the third-party system 130 may be retrieved and communicated to the third-party system 130. Communicating multiple application-specific user identifiers to the third-party system 130 allows the third-party system 130 to more easily target advertisements or other content to a user across multiple applications associated with the third-party system 130 that the user has installed using the application-specific user identifiers.

Information associated with the determined online system user identifier is communicated 330 from the online system 140 to the entity from which the request was received 320.

The information communicated to the entity is subject to one or more privacy settings associated with the online system user identifier, allowing the user corresponding to the online system user identifier to regulate information communicated to the entity. For example, privacy settings associated with the online system user identify limit the communicated information to information describing interactions between the user and the application using the application-specific user identifier included in the request. Example information communicated 330 to the entity includes demographic information associated with the user associated with the online system user identifier, information describing actions performed by the user with the online system 140, and information describing actions performed by the user with the application. The online system 140 may also communicate 330 content personalized for presentation to the user by multiple applications associated with an entity associated with the application associated with the received request. Additionally, the online system 140 may communicate 330 the determined application-specific user identifier to the entity.

Figure 4:
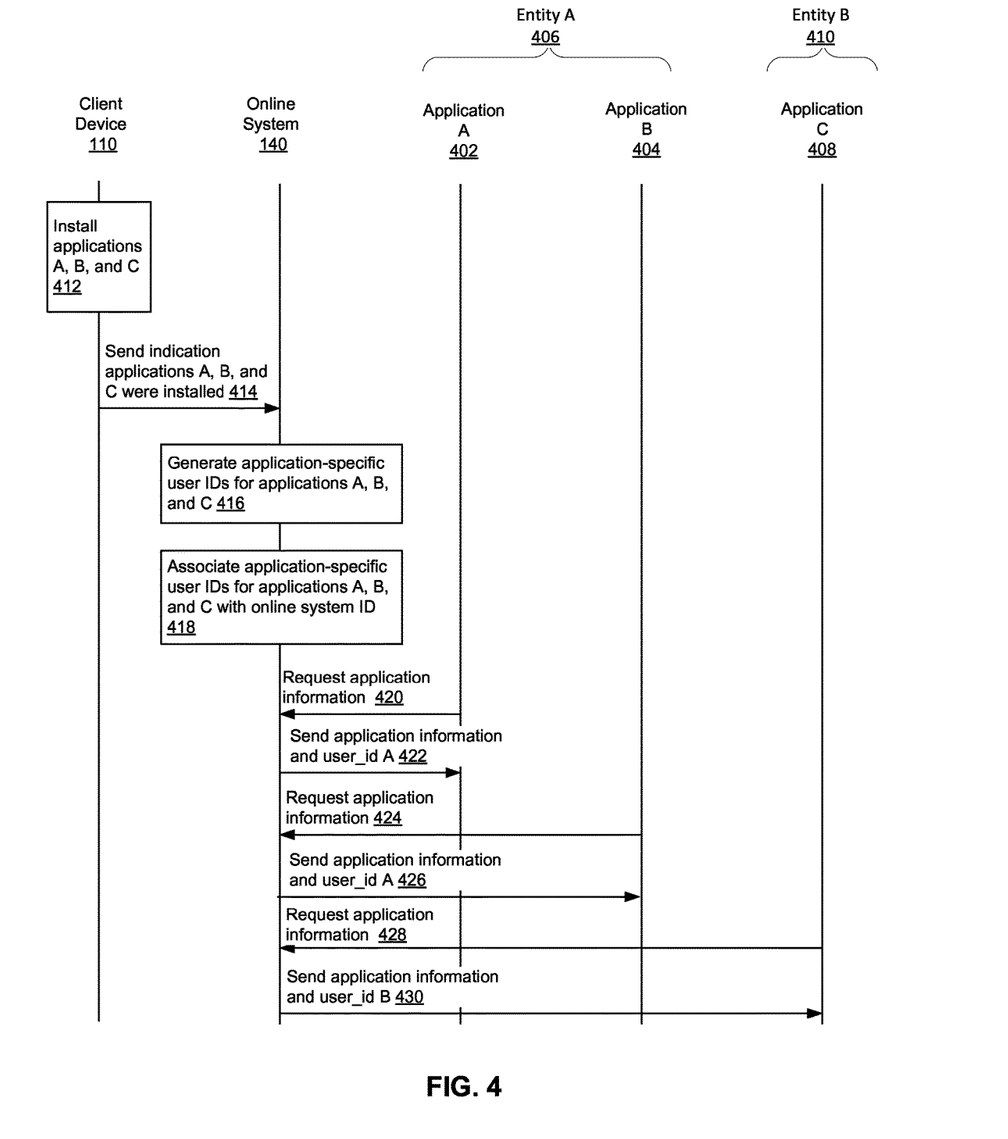
FIG. 4 is an event trace diagram for regulating access to information associated with a user by an online system by applications communicating with the online system, in accordance with an embodiment.

FIG. 4 illustrates an event trace diagram of one embodiment for regulating access to information associated with a user by an online system 140 by applications communicating with the online system 140. The event trace diagram in FIG. 4 describes the interaction between the client device 110, the online system 140, applications installed on the client device 110, and entities associated with the installed applications.

A user installs 412, on a client device 110, application A 402, application B 404, and application C 408. In one embodiment, application A 402 and application B 404 are associated with the entity A 406, and application C 406 is associated with the entity B 410. In one implementation, the entity A 406 is a third-party system 130A that provides multiple applications A 402 and B 404 to a user that communicates with the online system 140 as described with reference to FIG. 3, while the application C 406 is provided by a separate entity B 410 associated with a different third-party system 130B. When the application is installed on the client device 110, the client device 110 sends an indication that the user installed the application to the online system 140. For example, the client device 110 sends 414 an application identifier of the installed application, an application name of the installed application, or other information describing the application as described with reference to FIG. 3. The online system 140 generates 416 an application-specific user identifier for the application identified in the received indication and associates 418 each application identifier with an online system user identifier associated with the user. In the embodiment shown in FIG. 4, because the application A 402 and the application B 404 are also associated with a common entity, the online system 140 stores an identifier associated with the entity A 406 and associates information identifying the application A 402 and the application B 404 with the identifier associated with the entity A 406.

The online system 140 receives a request from an entity associated with the application for information about an online system user. The request includes information identifying the user, including the application-specific user identifier used by the application to identify the user. For example, the online system 140 receives 420 a request from the entity A 406 associated with the application A 402, extracts information identifying the application as well as an application-specific user identifier (e.g., user_id A) from the request. Using the extracted application-specific user identifier, the online system 140 determines an online system user identifier for the online system user associated with the client device 110 where the application A 402 is installed. Responsive to the request, the online system 140 sends 422 the application information for the user associated with application-specific identifier user_id A, along with other information about the user and the user's interactions with the application A 402. The entity A 406 also sends 424 a request for information about the user associated with the application B 404. The online system 140 also replies 426 with the application-specific identifier user_id A to the additional request from the entity A 406, since the application A 402 and the application B 404 are associated with a common entity A 406.

The entity B 410, however, is a different entity from the entity A 406, and thus communicates with the online system 140 using a different application-specific user identifier. For example, the entity B 410 sends 428 the online system 140 a request for information about the user associated with the application C 408. The request from the entity B 410 identifies the user by an application-specific identifier user_id B associated with the entity B 410. The online system 140 replies 430 to the request from the entity B 410 with the application-specific identifier user_id B, along with other information about the user and the user's interactions with the application C 408, which, in this example, is the only application associated with the entity B.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the invention be limited not by this detailed description, but rather by any claims that issue on an application based hereon. Accordingly, the disclosure of embodiments to be illustrative, but not limiting, of the scope of the patent rights, which is set forth in the following claims.

What is claimed is:

1. A method comprising:
   maintaining a plurality of online system user identifiers, each online system user identifier associated with a user of an online system;
   receiving an indication that an application was installed on a client device associated with the user at the online system from the client device, the indication including an application identifier of the application;
   generating an application-specific user identifier associated with the user at the online system, the application-specific user identifier identifying the user to the application;
   storing, at the online system, an association between the application and an application identifier;
   storing, at the online system, an association between the application identifier and the generated application-specific user identifier;
   storing an association between an online system user identifier identifying the user to the online system, the application-specific user identifier, and the application identifier;
   receiving a request for information associated with the user from an entity associated with the application, the request for information including the application identifier of the application and the application-specific user identifier identifying the user to the application;
   retrieving the online system user identifier identifying the user to the online system using the application identifier of the application and the application-specific user identifier identifying the user to the application from the received request and the stored association between the online system user identifier identifying the user to the online system, the application-specific user identifier, and the application identifier;
   retrieving information maintained by the online system in association with the online system user identifier; and
   communicating the retrieved information maintained by the online system in association with the online system user identifier that is associated with the determined application-specific user identifier and the application-specific user identifier to the entity without exposing the online system user identifier to the entity.

2. The method of claim 1, wherein the application identifier comprises an application name.

3. The method of claim 1, further comprising:
   receiving a request for information associated with the user from a requesting entity associated with an identified application installed on the client device by the user and associated with an additional application installed on the client device by the user;
   determining application-specific user identifiers associated with the identified application and with the additional application from the generated one or more application-specific identifiers;
   retrieving the online system user identifier associated with the determined application-specific user identifiers based on the stored associations; and
   communicating information associated with the online system user identifier associated with the determined application-specific user identifiers to the requesting entity.

4. The method of claim 1, wherein the indication that the user of the online system installed the application on the client device includes one or more selected from a group consisting of: an identifier of the client device, a type of the client device, a time when the application was installed, and any combination thereof.

5. The method of claim 1, further comprising:
   communicating the determined application-specific identifier to the entity associated with the specified application.

6. The method of claim 1, wherein the online system is a social networking system.

7. A method comprising:
   maintaining an online system user identifier associated with a user of an online system;
   maintaining information associated with the user in association with the online system user identifier;
   receiving an indication that one or more applications were installed on a client device associated with the user;
   storing information identifying each of the installed applications in association with an application-specific user identifier associated with each of the installed applications;
   storing associations between the online system user identifier with the information identifying each of the installed applications in association with a corresponding application-specific user identifier associated with each of the installed applications;
   receiving a request from an entity associated with a specified application installed on the client device associated with the user for information about the user, the request including an application-specific user identifier associated with the specified application and an application identifier of the specified application;
   retrieving the online system user identifier associated with the application-specific user identifier associated with the specified application and with the application identifier of the specified application from the stored associations; and
   communicating a subset of information associated with the online system user identifier by the online system and the application-specific user identifier associated with the specified application to the entity associated with the specified application without exposing the online system user identifier to the entity.

8. The method of claim 7, wherein the information identifying the application comprises an application name.

9. The method of claim 7, wherein the entity is associated with multiple applications installed on the client device associated with the user and wherein the method further comprises:
    retrieving information from the online system associating a set of applications installed on the client device with the entity;
    determining information identifying a plurality of applications form the set of applications;
    determining application-specific user identifiers associated each of the plurality of applications;
    retrieving the online system user identifier associated with the determined application-specific user identifiers; and
    communicating information associated with the online system user identifier associated with the determined application-specific user identifiers to the requesting entity.

10. The method of claim 9, wherein the communicated information associated with the online system user identifier associated with the determined application-specific user identifiers to the requesting entity includes the determined application-specific user identifiers.

11. The method of claim 7, wherein the online system is a social networking system.

12. A computer program product comprising a non-transitory computer-readable storage medium having instructions encoded thereon, that when executed by a processor, cause the processor to:
    maintain an online system user identifier associated with a user of an online system;
    maintain information associated with the user in association with the online system user identifier;
    receive an indication that one or more applications were installed on a client device associated with the user;
    store information identifying each of the installed applications in association with an application-specific user identifier associated with each of the installed applications;
    store associations between the online system user identifier with the information identifying each of the installed applications in association with a corresponding application-specific user identifier associated with each of the installed applications;
    receive a request from an entity associated with a specified application installed on the client device associated with the user for information about the user, the request including an application-specific user identifier associated with the specified application and an application identifier of the specified application;
    retrieve the online system user identifier associated with the application-specific user identifier associated with the specified application and with the application identifier of the specified application from the stored associations; and
    communicate a subset of information associated with the online system user identifier by the online system and the application-specific user identifier associated with the specified application to the entity associated with the specified application without exposing the online system user identifier to the entity.

13. The computer program product of claim 12, wherein the information identifying the application comprises an application name.

14. The computer program product of claim 12, wherein the entity is associated with multiple applications installed on the client device associated with the user and wherein the computer-readable storage medium further includes instructions that, when executed by the processor, cause the processor to:
    retrieve information from the online system associating a set of applications installed on the client device with the entity;
    determine information identifying a plurality of applications form the set of applications;
    determine application-specific user identifiers associated each of the plurality of applications;
    retrieve the online system user identifier associated with the determined application-specific user identifiers; and
    communicate information associated with the online system user identifier associated with the determined application-specific user identifiers to the requesting entity.

* * * * *

UNITED STATES PATENT AND TRADEMARK OFFICE
CERTIFICATE OF CORRECTION

PATENT NO. : 10,187,483 B2
APPLICATION NO. : 14/458210
DATED : January 22, 2019
INVENTOR(S) : Benjamin Golub et al.

Page 1 of 1

It is certified that error appears in the above-identified patent and that said Letters Patent is hereby corrected as shown below:

In the Claims

Column 15, Claim 9, Line 11, delete "identifiers associated each" and insert -- identifiers associated with each --

Column 16, Claim 14, Line 13, delete "identifiers associated each" and insert -- identifiers associated with each --

Signed and Sealed this
Fourth Day of June, 2019

Andrei Iancu
*Director of the United States Patent and Trademark Office*